Oct. 25, 1949.
M. MALLORY
2,486,185
OPPOSED PISTON INTERNAL-COMBUSTION ENGINE
Filed Sept. 25, 1946
3 Sheets-Sheet 1
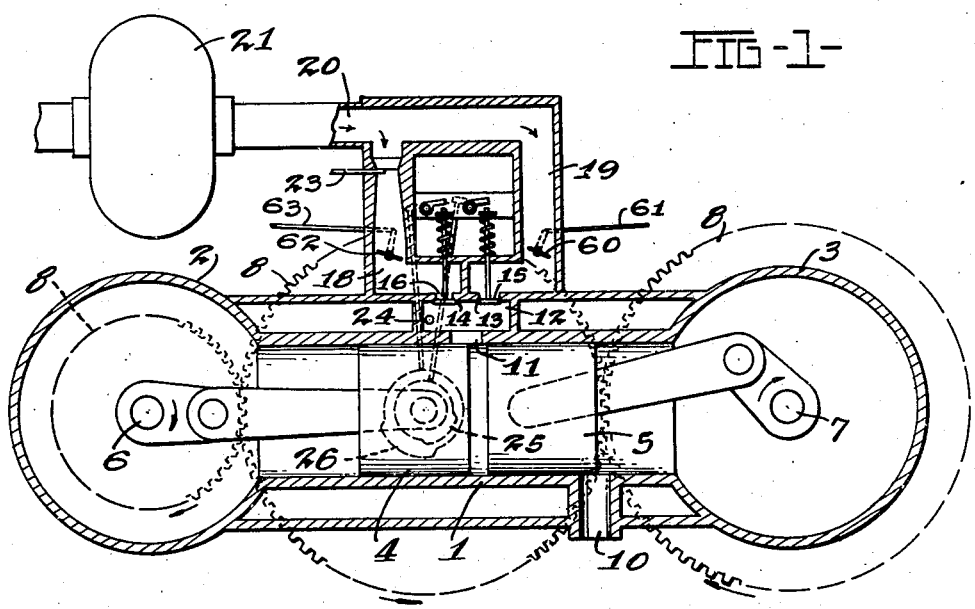
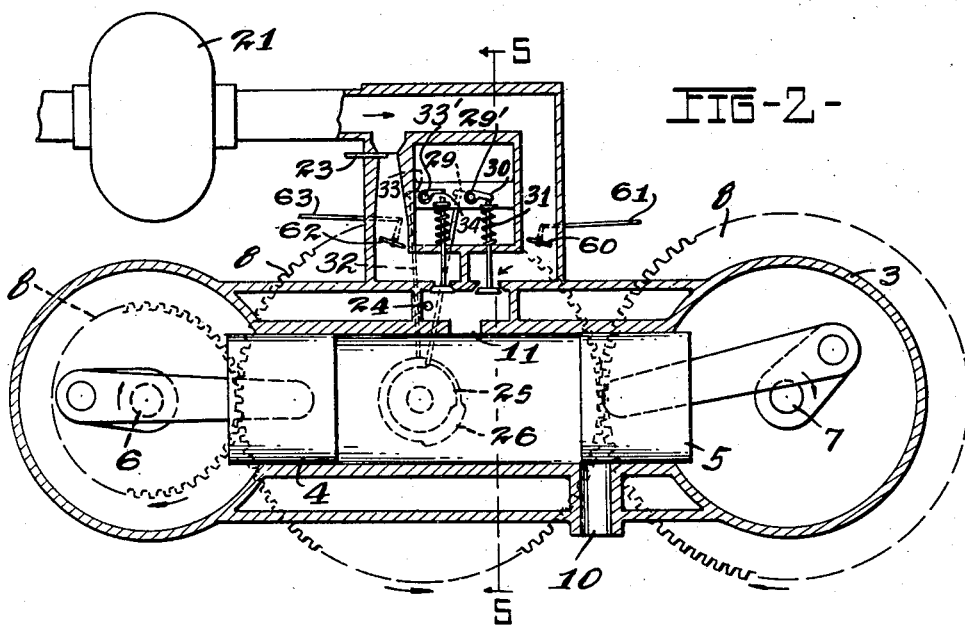
INVENTOR.
MARION MALLORY
BY
Owen & Owen,
Att'ys.

Oct. 25, 1949.  M. MALLORY  2,486,185
OPPOSED PISTON INTERNAL-COMBUSTION ENGINE
Filed Sept. 25, 1946  3 Sheets-Sheet 2
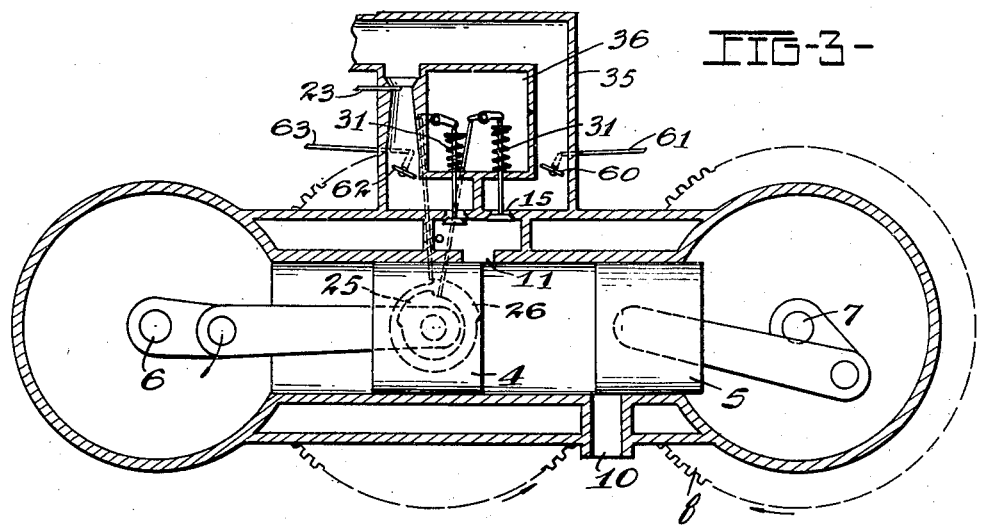
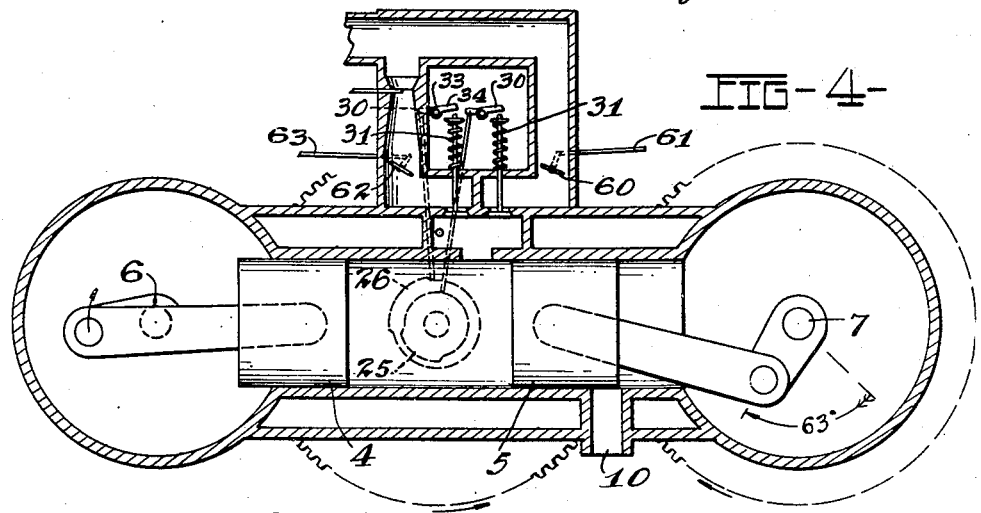
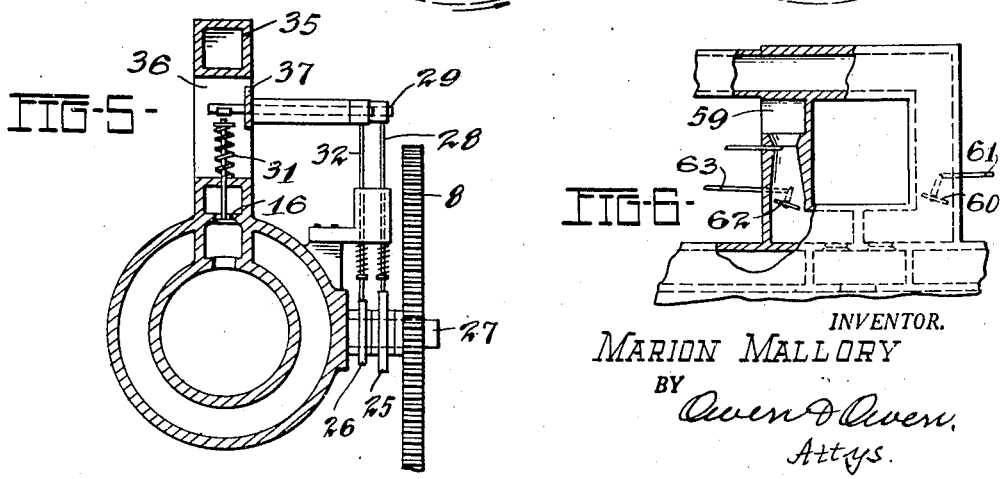
INVENTOR.
MARION MALLORY
BY Owen & Owen
Attys.

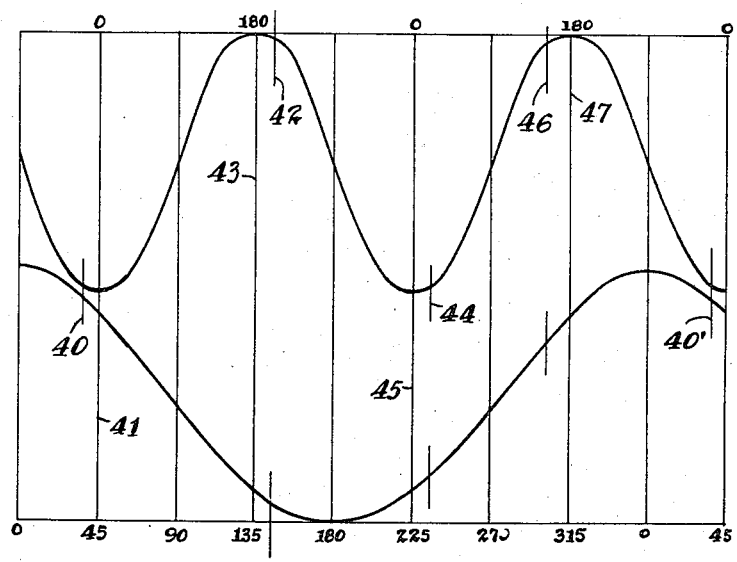
FIG-7-
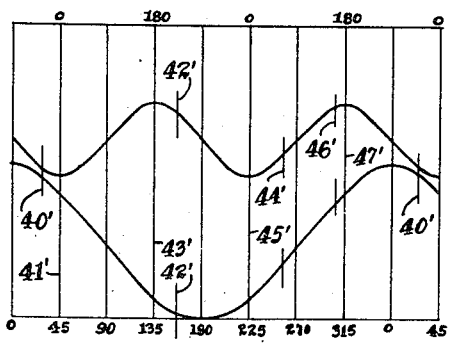
FIG-8-
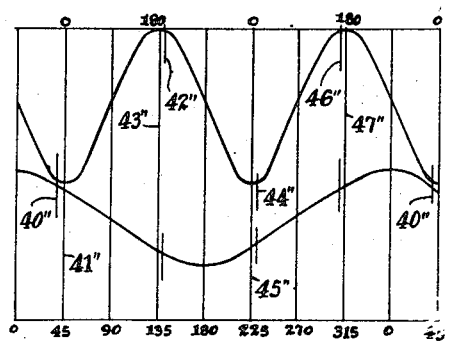
FIG-9-

Patented Oct. 25, 1949

2,486,185

UNITED STATES PATENT OFFICE 2,486,185

OPPOSED PISTON INTERNAL-COMBUSTION ENGINE

Marion Mallory, Detroit, Mich., assignor to The Mallory Research Company, Detroit, Mich., a corporation of Michigan Application September 25, 1946, Serial No. 699,327

15 Claims. (Cl. 123—51)

This invention relates to internal combustion engines, and particularly to improvements on the general type of engine disclosed in my Patent No. 2,345,056, dated March 28, 1944.

In such an engine, the compression, combustion and exhaust of the charges take place between two pistons operating in a common cylinder and having their separate crankshafts geared together with a ratio of two-to-one, with the slower moving piston controlling an exhaust port. This invention relates primarily to the air and fuel control for such an engine, and comprises an arrangement whereby a valve, timed by the engine, is opened to admit air under pressure to the cylinder through an auxiliary combustion chamber, and fuel is admitted by separately controlled means to the same chamber, preferably at the close of the air admission. In this way the compressed air may be used to scavenge the cylinder, the auxiliary chamber at least being very thoroughly scavenged, and fuel can be admitted into the scavenged auxiliary chamber in any desired amount. Then the charge may be fired in the auxiliary chamber, and there will be a sufficiently rich mixture to start combustion in that chamber even when the mixture in the main chamber may be quite lean. Somewhat similar results may be obtained by introducing the air and fuel in close juxtaposition and firing near the point of fuel admission, but the separate chamber is preferred.

For further control of the engine operation there are provided separate throttle valves for the compressed air and for the carbureted fuel, when that is used. These throttle valves may be normally operated together, or means for independent operation may be provided.

This general arrangement for air and fuel control may be utilized with widely varying engine operations. One particular utilization of the general principle, but without the independent throttle controls, is described and claimed in my copending application, Ser. No. 687,916, filed August 2, 1946, now Patent Number 2,473,759, June 21, 1949, but another application of the control will be disclosed herein.

Details of the invention, as well as further disclosure of its applications and possible modifications, will appear as the description proceeds.

In the accompanying drawings, forming a part of this specification,

Fig. 1 is a section through an engine, showing the position of the parts after the completion of the compression stroke, and at the beginning of the power stroke, with both the air and fuel admission valves closed; Fig. 2 is a similar section with parts omitted, showing the position of the movable parts at approximately the end of the power stroke of the fast moving piston, or at approximately the beginning of the opening of the exhaust by the slow moving piston, with the fuel valve still closed and the air admission valve starting to open; Fig. 3 is a view similar to Fig. 2, showing the position of the parts just after the end of the outstroke of the slow moving piston, with the fuel valve starting to open and the air admission valve just closed; Fig. 4 is a similar view showing the relative position of the parts near the start of the compression stroke, with both the fuel and the air admission valve closed, Fig. 5 is a reduced fragmentary cross-section on the line 5—5 in Fig. 2; Fig. 6 is an enlarged detail of the carburetor portion, sectioned as in Fig. 1 but showing a different air inlet; Fig. 7 is a diagrammatic showing of the movements of the pistons during one complete cycle of the engine; Fig. 8 is a view similar to Fig. 7 but showing the fast moving piston with a reduced travel, and Fig. 9 is a view similar to Fig. 7, but showing the slow moving piston with a reduced throw.

In the drawings, 1 designates an engine cylinder the ends of which open into respective crank cases 2 and 3. Pistons 4 and 5 operate in opposite ends of the cylinder and are connected to the crank arms of respective crankshafts 6 and 7, the former in the case 2 and the latter in the case 3. The crankshafts are connected in any suitable manner, as by a gear train 8, to have a turning ratio of two-to-one, so that the shaft 6 makes two complete revolutions to one of the shaft 7. The relationship of the connection of the pistons with their shafts is preferably such that when the wrist-pin of shaft 6 is in its inner dead center position, the wrist-pin connection of shaft 7 is approximately 45° advanced over its inner dead center position, as shown in Fig. 1. The rotation of the two shafts is preferably but not necessarily in clockwise direction.

The cylinder has an exhaust port 10 that is initially uncovered by the piston 5 when the piston moved with its crank has moved approximately 125° from inner dead center, as indicated in Fig. 2. The exhaust port 10 is of such cross-area that it will not be completely uncovered until the piston 5 has approximately reached the limit of its outstroke, thus causing the port to be open for approximately a 90° movement of the associated crank or until on its instroke it has reached the position shown in Fig. 3. This provides for the exhaust of all of the burnt gases from the cylinder after each explosion.

The air and fuel charges are admitted to the cylinder 1 through a centrally located port 11 from a chamber 12 to which said charges are respectively admitted through ports 13 and 14 controlled by respective valves 15 and 16. The control of the air valve 15 is such that an air charge is admitted to the cylinder starting at approximately the time of first uncovering of the exhaust port 10 by the piston 5 and continuing until the piston has completed its exhaust or during the 90° movement of the associated crank from the position shown in Fig. 2 to that in Fig. 3. The fuel valve is timed to start its opening when the fast moving crank is at approximately its inner dead center position indicated in Fig. 3, and is closed by approximately the end of a 180° outward stroke from such position. This causes a complete scavenging of the burnt gases from the cylinder after each explosion and before the admission of a fresh fuel charge thereto. The operation will be more completely described in connection with Fig. 7.

In the present instance, fuel is directed to the port 14 through a supply passage 18 and air is directed to the port 13 through a passage 19. These two passages have communication at their inner ends with a common passage 20 into which air is blown by a blower 21, or in any other suitable manner. Liquid fuel is blown or drawn by suction action into the fuel passage 18 through a nozzle 23 projected into said passage. It is thus apparent that when the fuel valve 16 is open, air from the passage 20 passes through the branch passage 18 carrying with it a fuel charge from nozzle 23 and this commingled air and fuel charge enters the chamber 12 where ignition preferably occurs. When the air valve 15 is open, an air charge from the branch passage 19 passes through the port 13 into the chamber 12 and thences passes either alone or with the fuel charge into the combustion chamber through the port 11. Ignition preferably takes place in the fuel receiving end of the chamber 12 by the sparking of a spark plug 24 therein, or in any other suitable manner. This causes ignition to take place in the portion of the chamber 12 in which the mixture is the richest and has not been diluted by air admitted to the opposite end portion of the chamber.

The means illustrated for operating the two valves 15 and 16 at proper points in a cycle of operations comprises two cams 25 and 26, respectively, mounted on a shaft 27 (Fig. 5) of the center gear of the train 8, which gear turns at the same speed as the crank shaft 7. The cam 25 operates a push-rod 28 that is connected to and operates a crank arm 29 on rock shaft 29' which in turn has an arm 30 serving as a tappet for engaging the stem of the air valve 15 and imparting an opening movement thereto against the tension of the valve spring 31. Likewise, the cam 26 operates a tappet rod 32 connected to an arm 33 on rock shaft 33' with a tappet arm 34 acting on the stem of the fuel mixture valve 16. This air valve is also normally retained in closed position by a spring 31. In the present instance, the means or frame part 35, which forms the passages 18, 19 and 20, is of loop-form to provide a central opening 36 in which the upper ends of the valve stems, the springs 31 and the tappet levers 30 and 34 are mounted, the shafts 29' and 33' being fulcrumed upon bracket arm 37 (Fig. 5) projecting from one side of said frame part.

In Fig. 7 there is a diagrammatic indication of the relative movement of the pistons 4 and 5, the upper line indicating the movement of piston 4 and the lower line indicating the movement of piston 5. As indicated on the diagram, it will be seen that the two pistons will be moving in the same direction and at the same speed slightly before the piston 4 reaches its innermost position at the end of the compression stroke. The firing preferably takes place at this point indicated on the diagram by line 40, the dead center position being indicated at 41. The piston 5 again travels in the same direction and at the same speed with piston 4 at line 42 shortly after piston 4 reaches outer dead center at 43. The exhaust is preferably open at this point and continues substantially open until the pistons again travel in the same direction at the same speed at line 44 slightly after the piston 4 reaches its innermost position at line 45. The pistons again move in the same direction at the same speed at line 46 at which point the compression stroke begins, slightly before the piston 4 reaches its outermost position in line 47. After the compression stroke the cycle is repeated.

In Fig. 8 there is a similar diagrammatic showing of the relative movements of the pistons when the fast moving piston is reciprocated only one-half as far as the slow moving piston. Mechanically it is preferable to move the rapidly reciprocating pistons a less distance than the slower moving piston. It will be understood that the terms fast and slow, while used in connection with the piston, really apply to the turning of their respective crank shafts. Lines 40' to 47' in Fig. 8 correspond to the like positions designated 40 to 47 in Fig. 7.

An inspection of Fig. 8 will show that the general operation is similar to that in Fig. 7 except that the firing will occur somewhat earlier and the end of the firing stroke may be somewhat later and the intake stroke is very much decreased since the outward movement of piston 4 will be very little more than the inward movement of piston 5 at this time. Accordingly for injection of fuel in this type of construction the use of air under pressure is essential since there would be relatively little suction.

In Fig. 9 there is a diagram similar to Fig. 7 except that the piston 5 is reciprocated a less distance than the piston 4. Mechanically this is not as desirable as having the piston 4 move a shorter distance, but for certain operations it is desirable, as will be noted from the diagram. The suction induced between lines 44 and 46 is much greater in Fig. 9 than in Fig. 8 and appreciable greater than in Fig. 7. Lines 40'' to 47'' in Fig. 9 correspond to like positions designated 40 to 47 in Fig. 7.

Where there is a construction providing sufficient suction during the intake stroke the alternative construction of the carburetor shown in Fig. 6 may be utilized. This is essentially the same as that shown in Fig. 1 except the air for the carburetor is received from the atmosphere through port 59 instead of being received from blower 21.

As shown in Fig. 1 the air passage 19 is controlled by a throttle valve 60 which may be operated at a desirable means indicated at 61. There is also provided a throttle valve 62 operated by a suitable means 63 for controlling the access of fuel to valve 16.

It will be readily seen that simultaneous operation of throttle valves 60 and 62 would operate and control the intake of air and fuel the same as is usually done by the throttle valve between the carburetor and the intake. However, for some purposes it is desirable to admit the usual amount of air even when the fuel in restricted, and therefore throttle valves 60 and 62 may be independently manipulated so that valve 60 may be opened with valve 62 closed either wholly or partially, so that little or no fuel will be used and at the same time air is admitted so as to avoid undue pumping of oil or other related difficulties. On the other hand, for starting purposes or when a rich mixture is desired for other reasons, valve 60 may be wholly or partially closed with throttle valve 62 relatively open. In any case where fuel is admitted through valve 14 it will be in the region of the spark plug 24 and, therefore, will be fired. When there is considerable fuel mixed with the air throughout the chamber 12, or into the main combustion chamber, this will be consumed also by the arrangement which makes certain that whatever fuel there is, much or little, will be mixed with substantially pure air and that the mixture adjacent the sparking plug will be rich enough for firing.

As will be noted from the diagrams, the invention is not limited to constructions where the throw of the two crank shafts is equal. If the air admitted to the carburetor is under atmospheric pressure, it is best to have the throw of the fast traveling crank at least equal to that of the slow traveling crank shaft. As the relative throw approaches the arrangement shown in Fig. 8, the suction decreases and it becomes increasingly useful to admit air to the carburetor under pressure.

While no detailed construction is shown for operating the throttle valves it will be readily understood that various arrangements may be made to control the relative position of these valves in accordance with the desired operation of the engine.

It will be noted that opening 11 is never closed by piston 4, and remains open during all of the firing stroke, all of the exhaust stroke, and all of the intake or charging stroke. In the construction shown, it is never completely closed, although the piston 5 nearly closes it near the end of the compression stroke. Thus the auxiliary chamber 12 is in communication with the space between the cylinders all through the exhaust stroke to admit air under pressure from blower 24, during the charging stroke to admit air and fuel, during the compression stroke to equalize pressure in chamber 12 with that between the pistons, and during the firing stroke so combustion and the expanding gases may spread from chamber 12 to the space between the pistons. This constitutes a marked advantage over arrangements where the air and fuel intakes are restricted by the pistons. It is particularly necessary for opening 11 to communicate with the cylinder when the pistons are closest together, at the firing point.

As indicated above, the throttle valves are highly advantageous for allowing flexibility in the operation of the engine, but where such flexibility is not required they may be omitted. For purposes of simplicity, but one cylinder is shown, but this may be duplicated as many times as desired, in the usual manner.

Some modifications adapted for particular uses have been pointed out, but it will be understood that other changes may be made within the scope of the appended claims while retaining at least some of the advantages of the invention.

What I claim is:

1. An internal combustion engine having a cylinder, opposed pistons in the cylinder, connections between the pistons making the pistons reciprocate in a two-to-one ratio, so that one piston makes four strokes while the other makes two, an exhaust port only at one end of the cylinder and uncovered at the outer end of the out stroke of said two-stroke piston, and means to introduce air and fuel into the cylinder through a port in its wall constantly open into the space between the pistons.

2. An internal combustion engine having a cylinder, opposed pistons in the cylinder, connections between the pistons making the pistons reciprocate in a two-to-one ratio, so that one piston makes four strokes while the other makes two, an exhaust port only at one end of the cylinder and uncovered at the outer end of the out stroke of said two-stroke piston, means to supply air and fuel at closely adjacent points to the cylinder between the pistons once during each two strokes of said two-stroke piston, and separate means to time the supply of the air and of the fuel.

3. An internal combustion engine having a cylinder, opposed pistons in the cylinder, connections between the pistons making the pistons reciprocate in a two-to-one ratio, so that one piston makes four strokes while the other makes two, an exhaust port only at one end of the cylinder and uncovered at the outer end of the out stroke of said two-stroke piston, a port through the side of the cylinder between the pistons when they are closest together, and means to supply air and fuel through said port.

4. An internal combustion engine having a cylinder, opposed pistons in the cylinder, connections between the pistons making the pistons reciprocate in a two-to-one ratio, so that one piston makes four strokes while the other makes two, an exhaust port only at one end of the cylinder and uncovered at the outer end of the out stroke of said two-stroke piston, a port through the side of the cylinder between the pistons when they are closest together, a chamber leading to said port, a compressed air passage opening into said chamber, a fuel passage opening into said chamber, and separately controlled timing valves in said passages.

5. An internal combustion engine having a cylinder, opposed pistons in the cylinder, connections between the pistons making the pistons reciprocate in a two-to-one ratio, so that one piston makes four strokes while the other makes two, an exhaust port only at one end of the cylinder and uncovered at the outer end of the out stroke of said two-stroke piston, a port through the side of the cylinder between the pistons when they are closest together, a chamber leading to said port, a compressed air passage opening into said chamber, a fuel passage opening into said chamber, separately controlled timing valves in said passages, means to open the air timing valve susbtantially all the while the exhaust port is uncovered and means to open the fuel timing valve after the closing of the exhaust valve.

6. An internal combustion engine having a cylinder, opposed pistons in the cylinder, connections between the pistons making the pistons reciprocate in a two-to-one ratio, so that one piston makes four strokes while the other makes two, an exhaust port uncovered at the outer end of the out stroke of said two-stroke piston, a port through the side of the cylinder between the pistons when they are closest together, a chamber leading to said port, a compressed air passage opening into said chamber, a fuel passage opening into said chamber, and separately controlled timing valves in said passages, and a throttle valve in each of said passages outside of the respective timing valve.

7. An internal combustion engine having a cylinder, opposed pistons in the cylinder, connections between the pistons making the pistons reciprocate in a two-to-one ratio, so that one piston makes four strokes while the other makes two, an exhaust port uncovered at the outer end of the out stroke of said two-stroke piston, a port through the side of the cylinder between the pistons when they are closest together, a chamber leading to said port, a compressed air passage opening into said chamber, a fuel passage opening into said chamber, separately controlled timing valves in said passages, a throttle valve in each of said passages outside of the respective timing valve, and separate means for controlling said throttle valves.

8. An internal combustion engine having a cylinder, opposed pistons in the cylinder, crank shafts geared together in two-to-one ratio and connected to the pistons so that one piston makes two strokes while the other makes four, the two-stroke piston having a lead over the four-stroke piston when the two pistons are nearest together, an exhaust port uncovered by the two-stroke piston at the outer end of its stroke, a port through the cylinder wall opening into the space between the pistons when they are nearest together, separate air and fuel passages leading to the last said port, and separate timing valves for the passages.

9. An internal combustion engine having a cylinder, opposed pistons in the cylinder, crank shafts geared together in two-to-one ratio and connected to the pistons so that one piston makes two strokes while the other makes four, the two-stroke piston having a lead over the four-stroke piston when the two pistons are nearest together, an exhaust port uncovered by the two-stroke piston at the outer end of its stroke, a port through the cylinder wall opening into the space between the pistons when they are nearest together, separate air and fuel passages leading to the last said port, separate timing valves for the passages, and separate throttle valves in the passages outside of the timing valves.

10. An internal combustion engine having a cylinder, opposed pistons in the cylinder, crank shafts geared together in two-to-one ratio and connected to the pistons so that one piston makes two strokes while the other makes four, the two-stroke piston having a lead over the four-stroke piston when the two pistons are nearest together, an exhaust port uncovered by the two-stroke piston at the outer end of its stroke, a port through the cylinder wall opening into the space between the pistons when they are nearest together, separate air and fuel passages leading to the last said port, separate timing valves for the passages, timing means opening the air valve at substantially the time the exhaust opens and opening the fuel valve after the exhaust valve closes.

11. An internal combustion engine having a cylinder, opposed pistons in the cylinder, crank shafts geared together in two-to-one ratio and connected to the pistons so that one piston makes two strokes while the other makes four, the two-stroke piston having a lead over the four-stroke piston when the two pistons are nearest together, an exhaust port uncovered by the two-stroke piston at the outer end of its stroke, a port through the cylinder wall opening into the space between the pistons when they are nearest together, separate air and fuel passages leading to the last said port, separate timing valves for the passages, timing means opening the air valve at substantially the time the exhaust opens and opening the fuel valve after the exhaust valve closes, and separate throttle valves in the passages outside the timing valves.

12. An internal combustion engine having a cylinder, opposed pistons in the cylinder, crank shafts geared together in two-to-one ratio and connected to the pistons so that one piston makes two strokes while the other makes four, the two-stroke piston having a lead over the four-stroke piston when the two pistons are nearest together, an exhaust port uncovered by the two-stroke piston at the outer end of its stroke, a port through the cylinder wall opening into the space between the pistons when they are nearest together, a source of air under pressure, two passages from said source to the last said port, means to supply fuel to one of said passages, and separate timing valves in said passages.

13. An internal combustion engine having a cylinder, opposed pistons in the cylinder, crank shafts geared together in two-to-one ratio and connected to the pistons so that one piston makes two strokes while the other makes four, the two-stroke piston having a lead over the four-stroke piston when the two pistons are nearest together, an exhaust port uncovered by the two-stroke piston at the outer end of its stroke, a port through the cylinder wall opening into the space between the pistons when they are nearest together, a source of air under pressure, two passages from said source to the last said port, means to supply fuel to one of said passages, and separate timing valves in said passages, and separate throttle valves in said passages outside of the timing valves.

14. An internal combustion engine having a cylinder, opposed pistons in the cylinder, crank shafts geared together in two-to-one ratio and connected to the pistons so that one piston makes two strokes while the other makes four, the two-stroke piston having a lead over the four-stroke piston when the two pistons are nearest together, an exhaust port uncovered by the two-stroke piston at the outer end of its stroke, a port through the cylinder wall opening into the space between the pistons when they are nearest together, the four-stroke piston having strokes at least as long as those of the two-stroke piston, a source of air under pressure, a passage leading from said source to the last said port, a timing valve in the passage, a passage leading past a fuel supply to the last said port, and a timing valve in the last said passage between the fuel supply and the port.

15. An internal combustion engine having a cylinder, opposed pistons in the cylinder, crank shafts geared together in two-to-one ratio and connected to the pistons so that one piston makes two strokes while the other makes four, the two-stroke piston having a lead over the four-stroke piston when the two pistons are nearest together, an exhaust port uncovered by the two-stroke piston at the outer end of its stroke, a port through the cylinder wall opening into the space between the pistons when they are nearest together, the four-stroke piston having a shorter stroke than the two-stroke piston, separate air and carbureted fuel passages leading to the last said port, a timing valve for each passage, and means to supply air under pressure to each passage.

MARION MALLORY.

REFERENCES CITED

The following references are of record in the file of this patent.

UNITED STATES PATENTS

| Number | Name | Date |
|---|---|---|
| 670,966 | Pender | Apr. 2, 1901 |
| 1,168,877 | Froelich | Jan. 18, 1916 |
| 1,237,696 | Rayl | Aug. 21, 1917 |
| 1,324,520 | Robbins | Dec. 9, 1919 |

FOREIGN PATENTS

| Number | Country | Date |
|---|---|---|
| 849,614 | France | 1939 |